United States Patent
Kondo et al.

(10) Patent No.: US 10,290,991 B2
(45) Date of Patent: May 14, 2019

(54) SOLID LASER AMPLIFICATION DEVICE

(71) Applicant: MITSUBISHI HEAVY INDUSTRIES, LTD., Tokyo (JP)

(72) Inventors: Yoshiyuki Kondo, Tokyo (JP); Yuichi Otani, Tokyo (JP); Yoshiteru Komuro, Tokyo (JP); Atsushi Kodama, Tokyo (JP); Koichi Hamamoto, Tokyo (JP); Hiroyuki Daigo, Tokyo (JP); Naoki Inoue, Tokyo (JP); Tomoya Morioka, Tokyo (JP); Masahiro Kato, Tokyo (JP); Shingo Nishikata, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 15/574,190

(22) PCT Filed: Jun. 8, 2016

(86) PCT No.: PCT/JP2016/067060
§ 371 (c)(1),
(2) Date: Nov. 15, 2017

(87) PCT Pub. No.: WO2017/064881
PCT Pub. Date: Apr. 20, 2017

(65) Prior Publication Data
US 2018/0145473 A1    May 24, 2018

(30) Foreign Application Priority Data
Oct. 16, 2015   (JP) ................................ 2015-204802

(51) Int. Cl.
*H01S 3/042*    (2006.01)
*H01S 3/04*     (2006.01)
(Continued)

(52) U.S. Cl.
CPC ............ *H01S 3/042* (2013.01); *H01S 3/0407* (2013.01); *H01S 3/0606* (2013.01);
(Continued)

(58) Field of Classification Search
CPC .............................. H01S 5/042; H01S 3/2316
See application file for complete search history.

(56) References Cited

U.S. PATENT DOCUMENTS 3,633,126 A    1/1972   Schenectady
5,802,087 A    9/1998   Takaichi
(Continued)

FOREIGN PATENT DOCUMENTS

EP    2 312 706    4/2011
JP    48-15599     5/1973
(Continued)

OTHER PUBLICATIONS

Pop et al., "Thermal properties of graphene: fundamentals and applications", MRS Bull. 37, 1273 (2012).*
(Continued)

*Primary Examiner* — Tod T Van Roy
(74) *Attorney, Agent, or Firm* — Wenderoth, Lind & Ponack, L.L.P.

(57) ABSTRACT

This solid laser amplification device has: a laser medium part that has a solid medium, into which a laser light enters from an entrance part and from which the laser light (L) is emitted to the outside from an exit part, and an amplification layer, which is provided on the surface of the medium, receives the laser light in the medium, and amplifies and reflects said light toward the exit part; a microchannel cooling part that cools the amplification layer; and a thermally conductive part that is provided so as to make contact
(Continued)

between the amplification layer and the cooling part and transfers the heat of the amplification layer to the cooling part.

4 Claims, 4 Drawing Sheets

(51) Int. Cl.
*H01S 3/06* (2006.01)
*H01S 3/23* (2006.01)
*H01S 3/16* (2006.01)
*H01S 3/00* (2006.01)
*H01S 3/02* (2006.01)

(52) U.S. Cl.
CPC ............ *H01S 3/0612* (2013.01); *H01S 3/005* (2013.01); *H01S 3/025* (2013.01); *H01S 3/0405* (2013.01); *H01S 3/0604* (2013.01); *H01S 3/0621* (2013.01); *H01S 3/1611* (2013.01); *H01S 3/1643* (2013.01); *H01S 3/1685* (2013.01); *H01S 3/2316* (2013.01)

(56) References Cited

U.S. PATENT DOCUMENTS

| 6,002,695 | A | 12/1999 | Alfrey et al. |
| 6,339,605 | B1 * | 1/2002 | Vetrovec ................ H01S 3/025 359/333 |
| 7,430,230 | B2 | 9/2008 | Savich |
| 8,929,413 | B2 | 1/2015 | Aubry et al. |

| 2002/0097769 | A1 | 7/2002 | Vetrovec |
| 2005/0189647 | A1 | 9/2005 | Sung |
| 2006/0227841 | A1 | 10/2006 | Savich |
| 2007/0297469 | A1 | 12/2007 | Brown |
| 2011/0176574 | A1 | 7/2011 | Ikegawa et al. |

FOREIGN PATENT DOCUMENTS

| JP | 08-191167 | | 7/1996 |
| JP | 09-181376 | | 7/1997 |
| JP | 2001-015844 | | 1/2001 |
| JP | 2001-501776 | | 2/2001 |
| JP | 2008-532264 | | 8/2008 |
| JP | 5135207 | | 11/2012 |
| JP | 2014-022568 | * | 2/2014 |
| JP | 2014-504011 | | 2/2014 |

OTHER PUBLICATIONS

International Search Report dated Aug. 23, 2016 in International (PCT) Application No. PCT/JP2016/067059 with English Translation.
Written Opinion of the International Searching Authority dated Aug. 23, 2016 in International Application No. PCT/JP2016/067059 with English translation.
Written Opinion of the International Searching Authority dated Aug. 30, 2016 in International Application No. PCT/JP2016/067060.
Extended European Search Report dated Sep. 6, 2018 in European Patent Application No. 16855134.9.
Extended European Search Report dated Aug. 27, 2018 in corresponding European Patent Application No. 16855135.6.

* cited by examiner

SOLID LASER AMPLIFICATION DEVICE

TECHNICAL FIELD

The present invention relates to a solid laser amplification device.

BACKGROUND ART

A solid laser is a laser using a solid for a laser medium. A solid laser amplification device is a device for increasing (amplifying) the output of a laser light by passing the laser light through a laser medium. For example, in the case of a slab type solid laser amplification device, a laser light entering a laser medium advances in a zigzag manner in the laser medium while being reflected by both the opposite surfaces of the laser medium, whereby amplification is performed.

The laser medium is heated by the laser light passing through the inside thereof, and therefore, cooling is required. In the related art, direct cooling is used for the cooling of the laser medium. In the direct cooling, the cooling is performed, for example, by pressurizing the interior of a cooling chamber provided so as to cover the surface of the laser medium and injecting liquid nitrogen toward the surface of the laser medium in the cooling chamber.

CITATION LIST

Patent Literature

[PTL 1] Japanese Patent No. 5135207

SUMMARY OF INVENTION

Technical Problem

Here, the cooling chamber in which the liquid nitrogen is injected needs to be hermetically sealed for the cooling and is hermetically sealed from the outside, for example, by providing a sealing material between the laser medium and the cooling chamber. However, due to thermal elongation or the like due to a change in the temperature of the laser medium, there is a case where sealing with the sealing material becomes difficult. In a case where the sealing is not properly performed, there is a concern that the cooling of the laser medium may not be properly performed.

Therefore, the present invention has an object to provide a solid laser amplification device in which cooling of a laser medium is properly performed.

Solution to Problem

In order to solve the above-mentioned problem and achieve the object, a solid laser amplification device of this disclosure includes: a laser medium part which has a solid medium, into which a laser light enters from an entrance part and from which the laser light is emitted from an exit part to the outside, and an amplification layer which is provided on a surface of the medium, receives the laser light in the medium, and amplifies and reflects the laser light toward the exit part; a microchannel type cooling part which cools the amplification layer; and a thermally conductive part which is provided in contact with the amplification layer and the cooling part between the amplification layer and the cooling part and transfers heat of the amplification layer to the cooling part.

According to this solid laser amplification device, indirect cooling is performed, and therefore, it is not necessary to perform sealing in order to cool the laser medium part and it is possible to properly cool the laser medium part.

In the solid laser amplification device, it is preferable that the amplification layer, the thermally conductive part, and the cooling part are provided on each of the opposite surfaces of the medium. According to this the solid laser amplification device, the amplification layer that is a place which easily reaches a high temperature by receiving the laser light is reliably cooled, and therefore, it is possible to more properly cool the amplification layer.

In the solid laser amplification device, it is preferable that a plurality of the cooling parts and a plurality of the thermally conductive parts are provided at predetermined intervals along a traveling direction of the laser light. According to this the solid laser amplification device, it is possible to suppress bias of a temperature distribution in the laser medium part and suppress a decrease in the performance of the laser light.

In the solid laser amplification device, it is preferable that the thermally conductive part is a graphite sheet, a surface on one side of the thermally conductive part is in contact with the amplification layer, and a surface on the other side is in contact with the cooling part. According to this the solid laser amplification device, the thermally conductive part is a graphite sheet having high thermal conductivity, and therefore, it is possible to more efficiently transfer the heat of the amplification layer to the cooling part.

In the solid laser amplification device, it is preferable that in the thermally conductive part, thermal conductivity thereof along a direction parallel to the surface on one side is higher than thermal conductivity thereof along a direction crossing the surface on one side. According to this the solid laser amplification device, it is possible to cool the heat of the amplification layer on the entire surface of the cooling part by diffusing the heat in a surface direction of the thermally conductive part. Therefore, this thermally conductive part can more properly cool the amplification layer.

In the solid laser amplification device, it is preferable that in the thermally conductive part, thermal conductivity thereof alone a direction parallel to the surface on one side is lower than thermal conductivity thereof along a direction crossing the surface on one side. According to this the solid laser amplification device, it is possible to rapidly transfer the heat in a direction toward the cooling part from the amplification layer, and therefore, it becomes possible to more rapidly cool the amplification layer.

In the solid laser amplification device, it is preferable that a surface of the cooling part, with which the thermally conductive part is in contact, is a graphite sheet. According to this the solid laser amplification device, it is possible to increase the thermal conductivity of the cooling part itself, and therefore, it is possible to more properly cool the amplification layer.

Advantageous Effects of Invention

According to the present invention, it is possible to properly perform cooling of the laser medium.

DESCRIPTION OF EMBODIMENTS

Hereinafter, a preferred embodiment of the present invention will be described in detail with reference to the accompanying drawings. The present invention is not limited by this embodiment, and in a case where there are a plurality of embodiments, configurations made by combining the respective embodiments are also included in the present invention.

Figure 1:
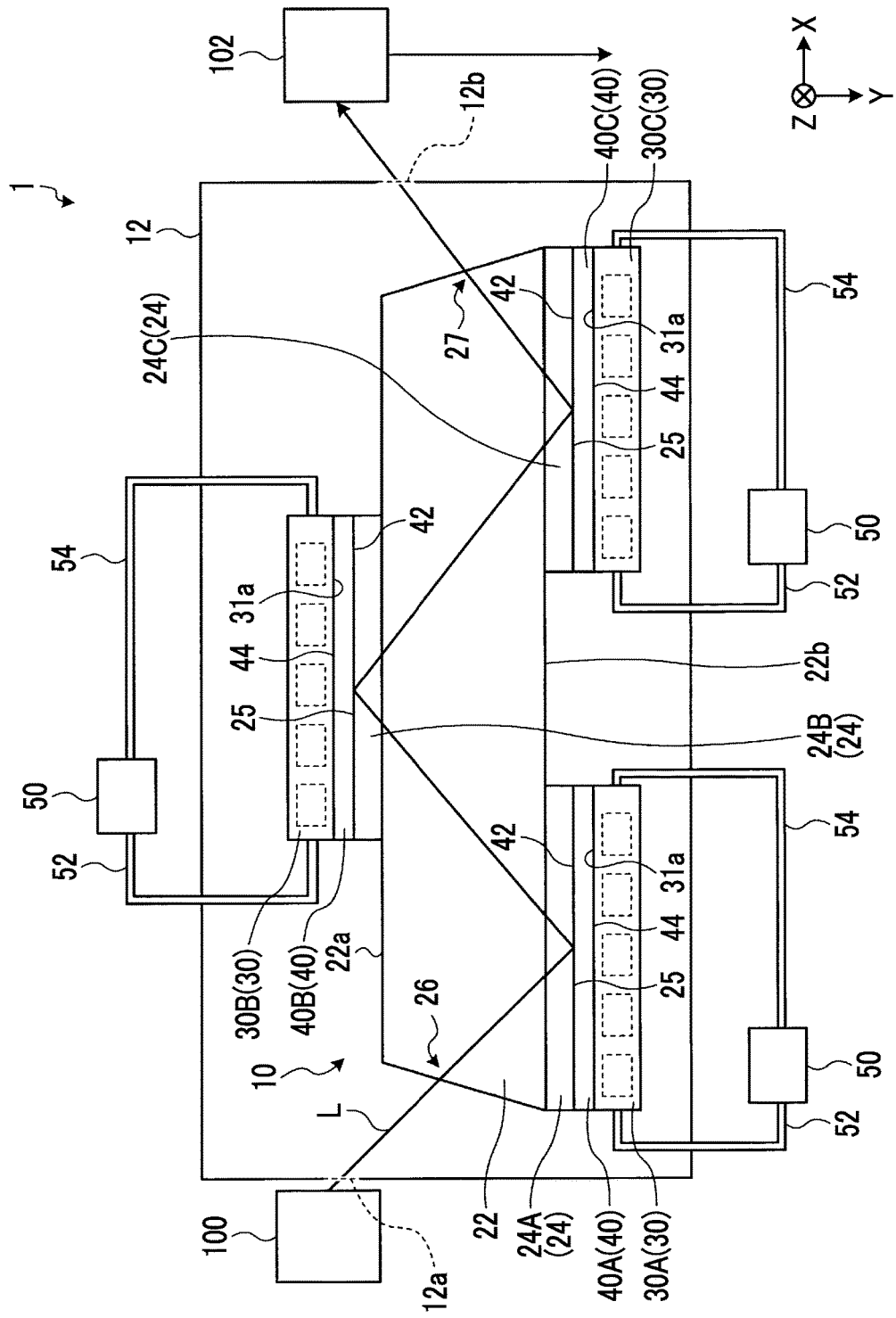
FIG. 1 is a schematic diagram showing the configuration of a solid laser device in the present embodiment.

FIG. 1 is a schematic diagram showing the configuration of a solid laser device in this embodiment. A solid laser device 1 according to this embodiment is a device for performing irradiation of a solid laser using a solid for a medium and is a slab type solid laser irradiation device. As shown in FIG. 1, the solid laser device 1 has a solid laser amplification device 10, an accommodation chamber 12, a light emitting part 100, and an irradiation part 102. The light emitting part 100 is an excitation light source of a laser light L and is, for example, a laser diode. The irradiation part 102 is, for example, a laser irradiation head. The solid laser device 1 makes the laser light L excited in the light emitting part 100 pass through the solid laser amplification device 10 provided in the accommodation chamber 12, thereby amplifying the laser light L, and irradiates the amplified laser light L from the irradiation part 102. The solid laser device 1 performs machining or the like with the irradiation of the laser light L from the irradiation part 102. The laser light L which is irradiated by the solid laser device 1 is a laser light having high output of 100 W/cm$^2$ or more, for example.

As shown in FIG. 1, the accommodation chamber 12 is a chamber for accommodating the solid laser amplification device 10 therein. The accommodation chamber 12 is a chamber hermetically sealed from the outside, and in use, gas in the interior thereof is discharged by a pump or the like, so that the accommodation chamber 12 is in a vacuum state. An entrance window 12a and an exit window 12b are provided in the accommodation chamber 12, and thus the laser light L from the light emitting part 100 is transmitted to the interior through the entrance window 12a and the laser light L in the interior is emitted from the exit window 12b to the irradiation part 102.

The solid laser amplification device 10 is an amplifying device of a so-called slab type solid laser. The solid laser amplification device 10 has a laser medium part 20, cooling parts 30A, 30B, and 30C, and thermally conductive parts 40A, 40B, and 40C.

The laser medium part 20 is a slab type laser medium for amplifying the laser light L. In this embodiment, the laser medium part 20 is Nd:YAG ceramics. The Nd:YAG ceramics is obtained by partially doping yttrium with neodymium in a process of producing a crystal of YAG (Yttrium Aluminum Garnet). The laser medium part 20 has a medium 22 and amplification layers 24A, 24B, and 24C. The medium 22 is a light-transmitting crystal (solid) such as YAG, for example. The amplification layers 24A, 24B, and 24C are layers provided on the surface of the medium 22 and are produced by doping ions of yttrium or the like on a plate made of the same material as the medium 22. The amplification layers 24A, 24B, and 24C are gain media which amplify the laser light L.

The medium 22 is a hexahedron (in this embodiment, a frustum). In the medium 22, the length thereof along a direction X is longer than the length along a direction Y. The direction Y is a direction crossing the direction X, and in this embodiment, it is a direction orthogonal to the direction X. Further, a direction Z (described later) is a direction crossing the direction X and the direction Y, and in this embodiment, it is a direction orthogonal to the direction X and the direction Y. In the medium 22, a surface on one side along the direction Y is an upper bottom surface 22a on the smaller area side, and a surface on the other side is a lower bottom surface 22b on the larger area side. However, the shape of the medium 22 is not limited thereto.

The amplification layers 24A and 24C are mounted on the lower bottom surface 22b with a predetermined interval therebetween along the direction X. The amplification layer 24B is mounted on the upper bottom surface 22a. The amplification layer 24B located between the amplification layer 24A and the amplification layer 24C along the direction X. Only one amplification layer 22B is mounted on the upper bottom surface 22a. However, similar to the lower bottom surface 22b, a plurality of amplification layers may be mounted on the upper bottom surface 22a with predetermined intervals.

Hereinafter, the amplification layers 24A, 24B, and 24C will be referred to as an amplification layer 24 in a case where they are not distinguished from each other. It can be said that the amplification layer 24 is provided on each of the opposite surfaces (the upper bottom surface 22a and the lower bottom surface 24b) of the medium 22 along the direction Y. Further, it can be said that a plurality of amplification layers 24 are provided on the surface of the medium 22 at predetermined intervals along the direction X. However, the amplification layers 24 may not be provided at predetermined intervals along the direction X and may be provided over the entirety of the upper bottom surface 22a and the lower bottom surface 24b.

The laser light L enters the medium 22 from an entrance part 26 on the side surface of the medium 22. The laser light L entering the medium 22 enters the amplification layer 24. The laser light L entering the amplification layer 24 is amplified and is reflected by a surface 25 that is the surface of the amplification layer 24 on the side opposite to the medium 22. The laser light L reflected by the surface 25 enters the medium 22 again from the amplification layer 24 and is emitted from an exit part 27 on the side surface on the side opposite to the entrance part 26 along the direction X. A reflective layer which totally reflects the laser light L may be provided on the surface 25.

In the example of this embodiment, the laser light L entering the accommodation chamber 12 enters the amplification layer 24A from the entrance part 26 through the medium 22. The laser light L entering the amplification layer 24A is amplified and reflected and enters the amplification layer 24B through the medium 22. The laser light L entering the amplification layer 24B is amplified and reflected and enters the amplification layer 24C through the medium 22. The laser light L entering the amplification layer 24C is amplified and reflected, enters the medium 22, and is emitted from the exit part 27 toward the outside (the accommodation chamber 12). In this manner, the laser light L in this embodiment advances in a zigzag manner in the direction X in the laser medium part 20. Therefore, the direction X can also be referred to as a traveling direction of the laser light L.

Figure 2:
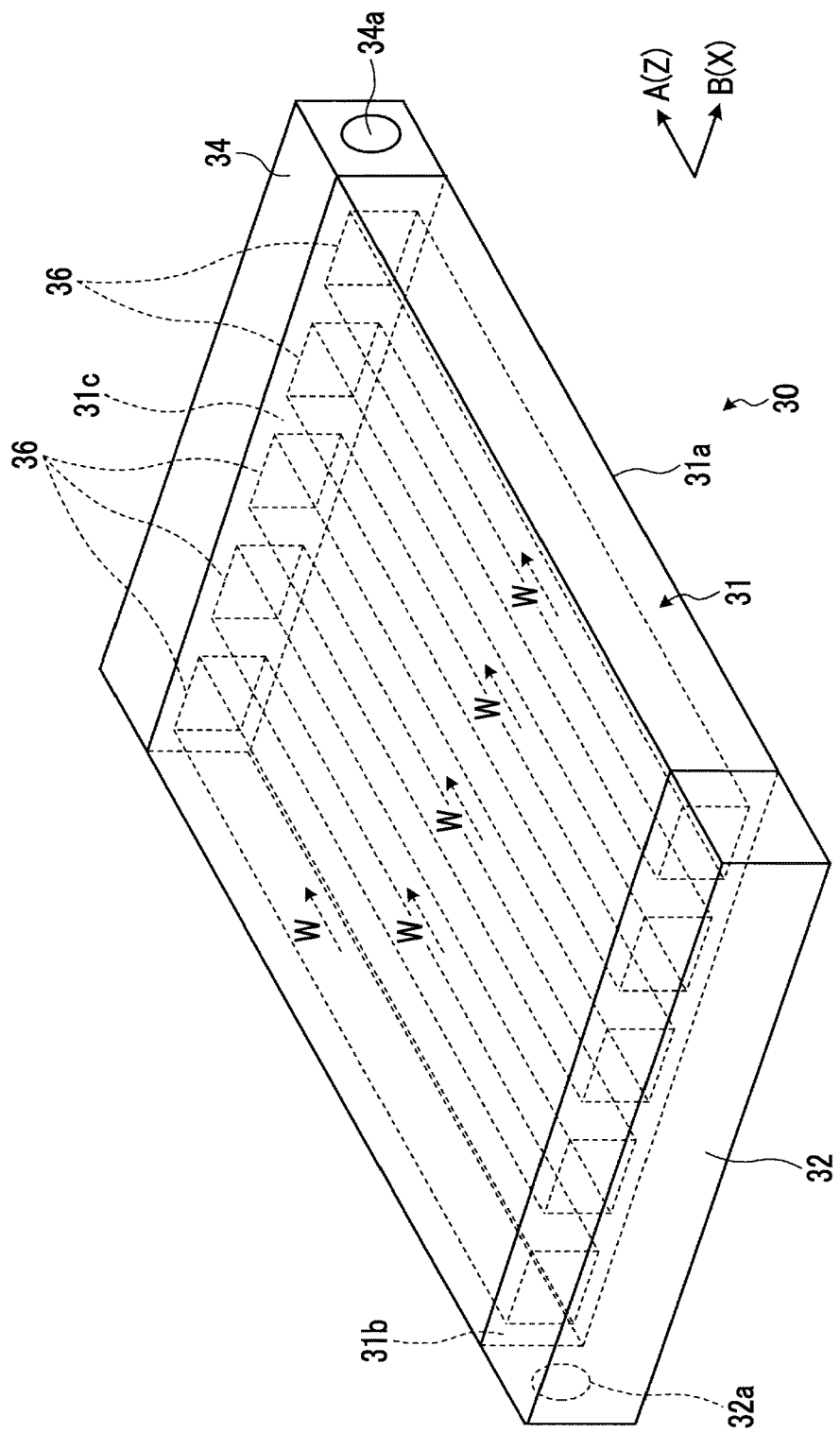
FIG. 2 is a schematic diagram of a cooling part in the present embodiment.

Next, the cooling parts 30A, 30B, and 30C will be described. Hereinafter, the cooling parts 30A, 30B, and 30C will be referred to as a cooling part 30 in a case where they are not distinguished from each other. FIG. 2 is a schematic diagram of the cooling part in this embodiment. The cooling part 30 is a microchannel type heat exchanger. As shown in FIG. 2, the cooling part 30 has a microchannel part 31, an inlet header part 32, and an outlet header part 34.

The microchannel part 31 is a plate-shaped member having a plurality of flow paths 36 opened therein. The flow paths 36 extend along a direction A parallel to a surface 31a of the microchannel part 31. The flow paths 36 are open on a side surface 31b on one side and a side surface 31c on the other side of the microchannel part 31 along the direction A and pass through from the side surface 31b on one side to the side surface 31c on the other side. A plurality of (in this embodiment, five) flow paths 36 are arranged along a direction B which is a direction parallel to the surface 31a of the microchannel part 31 and crosses the direction A. In this embodiment, the microchannel part 31 is a metal member having a relatively high thermal conductivity, such as aluminum or SUS (stainless steel). However, the material is not limited thereto.

The inlet header part 32 is a tubular member having a hollow inside. The inlet header part 32 is mounted on the side surface 31b on one side of the microchannel part 31. The inlet header part 32 has an opening portion (not shown) for making the internal space thereof communicate with each of the plurality of flow paths 36, and an introduction opening portion 32a for introducing a cooling solvent W into the internal space.

The outlet header part 34 is a tubular member having a hollow inside. The outlet header part 34 is mounted on the side surface 31b on the other side of the microchannel part 31. The outlet header part 34 has an opening portion (not shown) for making the internal space thereof communicate with each of the plurality of flow paths 36, and a lead-out opening portion 34a for introducing the cooling solvent W from the internal space to the outside.

In the cooling part 30, the cooling solvent W is introduced from the introduction opening portion 32a into the inlet header part 32, is distributed to the respective flow paths 36, and flows through the respective flow paths 36. The microchannel part 31 is in contact with an object to be cooled and cools the object to be cooled by the cooling solvent W flowing through the respective flow paths 36. The cooling solvent W flowing through the respective flow paths 36 flows toward the outlet header part 34. The cooling solvent W flowing into the outlet header part 34 is led out from the lead-out opening portion 34a to the outside, cooled on the outside, and introduced into the inlet header part 32 again. The cooling solvent W in this embodiment is a liquid in a state of being introduced into the inlet header part 32 and is, for example, liquid nitrogen, water, or the like.

Figure 3:
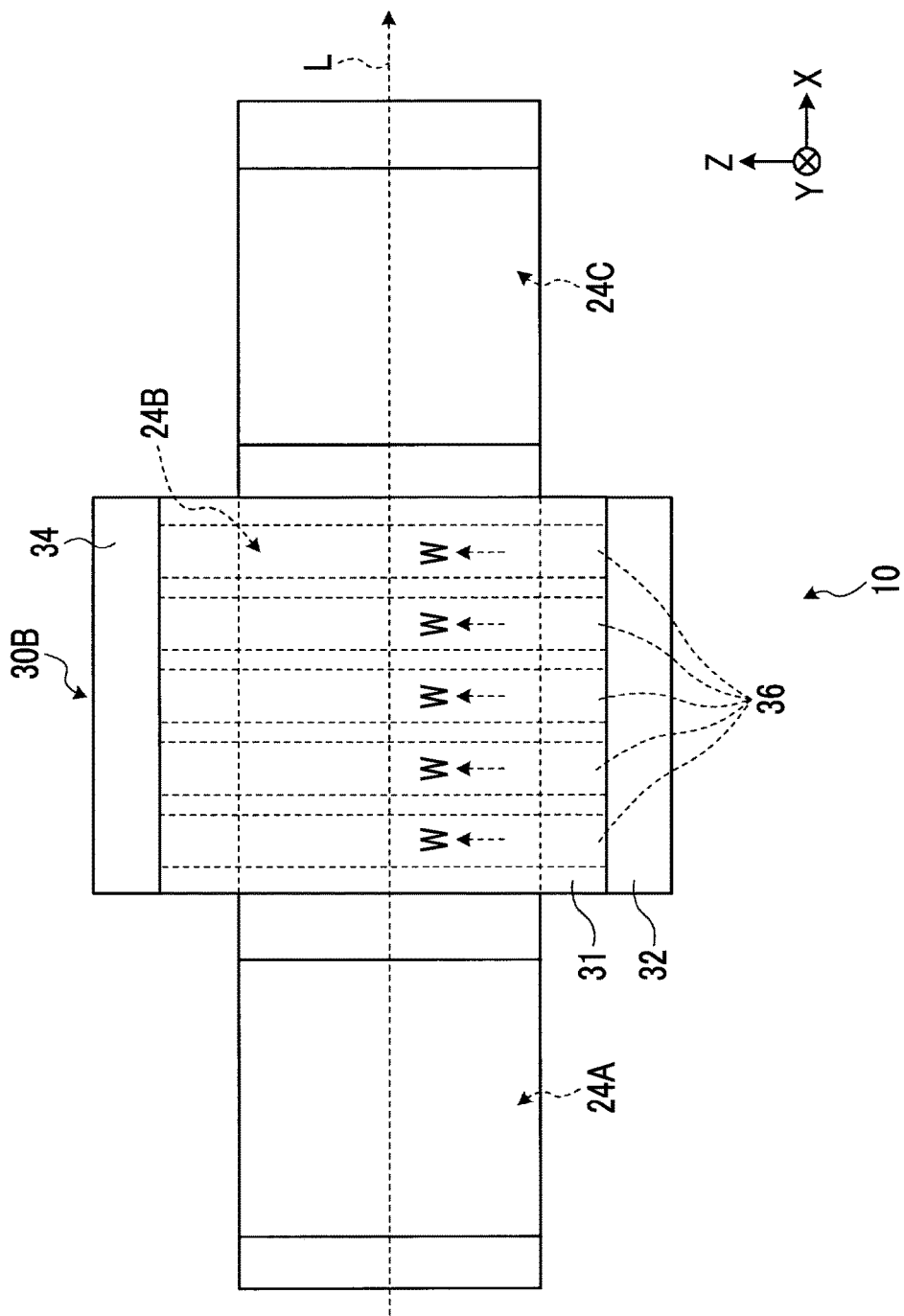
FIG. 3 is a schematic diagram of a solid laser amplification device in the present embodiment, as viewed from above.

FIG. 3 is a schematic diagram of the solid laser amplification device in this embodiment, as viewed from above. As shown in FIGS. 1 and 3, the surface 31a of each of the cooling parts 30 is mounted on a surface 42 of the amplification layer 24 with each of the thermally conductive parts 40A, 40B, 40C interposed therebetween, and thus the cooling part 30 cools the amplification layer 24. The cooling part 30A is mounted on the amplification layer 24A. The cooling part 30B is mounted on the amplification layer 24B. The cooling part 30C is mounted on the amplification layer 24C. Therefore, it can be said that the cooling part 30 is provided on each of the opposite surfaces (the surface on the upper bottom surface 22a side and the surface on the lower bottom surface 24b side) of the laser medium part 20 along the direction Y. Further, it can be said that a plurality of cooling parts 30 are provided on the surface of the laser medium part 20 at predetermined intervals along the direction X. That is, the cooling part 30 is provided at only the amplification layer 24 which reaches a high temperature by receiving (amplifying and reflecting) the laser light L, in the laser medium part 20. The cooling part 30 is mounted on each amplification layer 24 such that the direction A in which the flow path 36 extends is along the direction Z and the direction B in which the plurality of flow paths 36 are arranged is along the direction X. However, the mounting direction of the cooling part 30 is not limited thereto as long as the surface 31a is mounted on the surface 42 of the amplification layer 24, and for example, the direction A in which the flow path 36 extends may be along the direction X.

Further, as shown in FIG. 1, the cooling part 30 is connected to cooling solvent cooling part 50. Specifically, the cooling solvent cooling part 50 is provided outside the accommodation chamber 12, and the cooling solvent W is introduced into the introduction opening portion 32a of the inlet header part 32 through an introduction pipe 52. Further, in the cooling solvent cooling part 50, the cooling solvent W is led out from the lead-out opening portion 34a of the outlet header part 34 through a lead-out pipe 54. The cooling solvent cooling part 50 cools the cooling solvent W from the outlet header part 34 and supplies it to the inlet header part 32 again. The cooling solvent cooling part 50 may have any configuration as long as it cools the cooling solvent W, and for example, the cooling solvent cooling part 50 may has a configuration in which natural cooling is performed by providing fins between a plurality of tubes through which the cooling solvent W passes, or a configuration in which forced cooling is performed.

Figure 4:
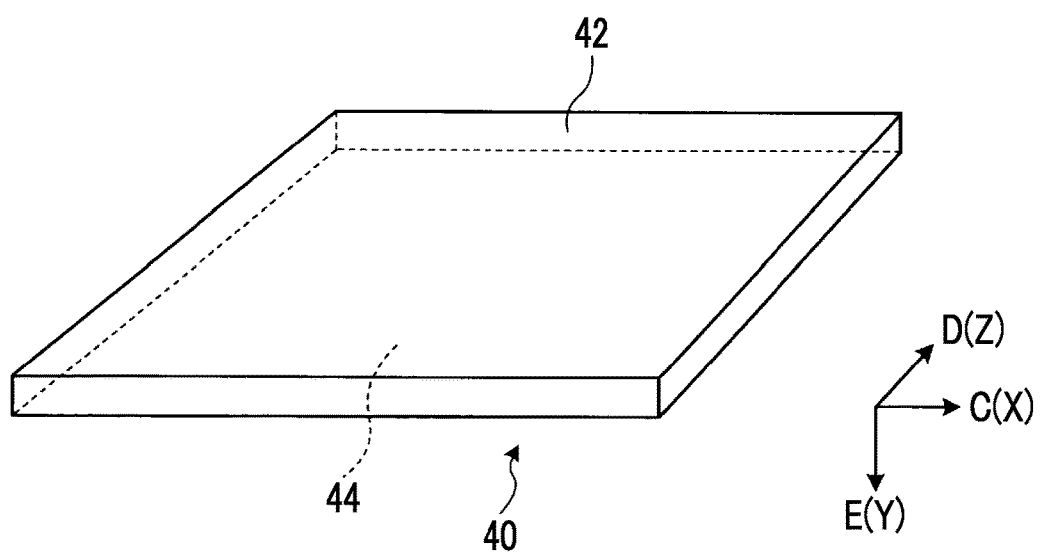
FIG. 4 is a schematic diagram showing the shape of a thermally conductive part.

Next, the thermally conductive parts 40A, 40B, and 40C will be described. Hereinafter, the thermally conductive parts 40A, 40B, and 40C will be referred to as a thermally conductive part 40 in a case where they are not distinguished from each other. FIG. 4 is a schematic diagram showing the shape of the thermally conductive part. As shown in FIGS. 1 and 4, the thermally conductive part is a plate-shaped member having high thermal conductivity, is provided in contact with the amplification layer 24 and the cooling part 30 between the amplification layer 24 and the cooling part 30, and transfers the heat of the amplification layer 24 to the cooling part 30. It is preferable that the thermally conductive part 40 is fixedly provided in close contact with the amplification layer 24 and the cooling part 30 between the amplification layer 24 and the cooling part 30. Specifically, in the thermally conductive part 40A, the surface 42 on one side is in contact with the surface 25 of the amplification layer 24A and a surface 44 on the other side in contact with the surface 31a of the cooling part 30A. Similarly, in the thermally conductive part 40B, the surface 42 on one side is in contact with the surface 25 of the amplification layer 24B and the surface 44 on the other side is in contact with the surface 31a of the cooling part 30B. Similarly, in the thermally conductive part 40C, the surface 42 on one side is in contact with the surface 25 of the amplification layer 24C and the surface 44 on the other side is in contact with the surface 31a of the cooling part 30C. Therefore, it can be said that the thermally conductive part 40 is provided on each of the opposite surfaces (the surface on the upper bottom surface 22a side and the surface on the lower bottom surface 24b side) of the laser medium part 20 along the direction Y. Further, it can be said that a plurality of thermally conductive parts 40 are provided on the surface of the laser medium part 20 at predetermined intervals along the direction X. In other words, the thermally conductive part 40 is provided at only the amplification layer 24 which reaches a high temperature by receiving the laser light L, in the laser medium part 20.

The thermally conductive part 40 is made of a material having thermal conductivity higher than those of the laser medium part 20 and the cooling part 30, and in this embodiment, it is a graphite sheet. The graphite sheet is a sheet which includes graphite, and is formed by extending, for example, a mixture of graphite powder and binder resin, or expanded graphite, in a sheet form. In the thermally conductive part 40 in this embodiment, graphite layers extending along directions C and D which are directions parallel to the surfaces (the surface 42 on one side and the surface 44 on the other side) are laminated along a direction E which is a direction perpendicular to the surfaces. The graphite layer is oriented along directions (for example, the directions C and D) parallel to the surface and has an anisotropy in thermal conductivity. Specifically, in the thermally conductive part 40, the thermal conductivity thereof along the direction C and the direction D is higher than the thermal conductivity along the direction E. That is, in the thermally conductive part 40, heat is transmitted more easily along the direction C and the direction D than the direction E. The thickness of the thermally conductive part 40 in this embodiment is greater than or equal to 0.1 mm and less than or equal to 1 mm. However, there is no limitation thereto.

The thermally conductive part 40 is mounted such that the surface 42 on one side is in contact with the surface 25 of the amplification layer 24 and the surface 44 on the other side is in contact with the surface 31a of the cooling part 30. Further, the thermally conductive part 40 is mounted such that the direction C is a direction parallel to the direction X, the direction D is a direction parallel to the direction Z, and the direction E is a direction parallel to the direction Y. However, the mounting direction of the thermally conductive part 40 is not limited thereto as long as the direction E is a direction parallel to the direction Y.

The solid laser amplification device 10 described above has the laser medium part 20 having the medium 22 and the amplification layer 24, the cooling part 30, and the thermally conductive part 40. The medium 22 is a solid laser medium into which the laser light enters from the entrance part 26 and from which the laser light L is emitted from the exit part 27 to the outside. Further, the amplification layer 24 is provided on the surface of the medium 22, receives the laser light in the medium 22, and amplifies and reflects the laser light L toward the exit part 27. Further, the cooling part 30 is a microchannel type heat exchanger which cools the amplification layer 24. Further, the thermally conductive part 40 is provided in contact with the amplification layer 24 and the cooling part 30 between the amplification layer 24 and the cooling part 30 and transfers the heat of the amplification layer 24 to the cooling part 30.

In the solid laser amplification device 10, the laser light L enters the amplification layer 24, and therefore, the amplification layer 24 is heated by the laser light L. The microchannel type cooling part 30 is mounted on the amplification layer 24 with the thermally conductive part 40 interposed therebetween. Therefore, the heat of the amplification layer 24 is transferred to the cooling part 30 through the thermally conductive part 40 and indirectly cooled by the cooling solvent W flowing in the cooling part 30. The solid laser amplification device 10 performs indirect cooling, and therefore, unlike direct cooling in which liquid nitrogen is injected to, for example, the user medium part 20 (the amplification layer 24), it is not necessary to perform sealing in order to cool the laser medium part 20. Therefore, according to the solid laser amplification device 10, it is possible to properly cool the laser medium part 20. Further, in the solid laser amplification device 10, heat is transferred to the cooling part 30 through the thermally conductive part 40. Therefore, in the solid laser amplification device 10, it is possible to efficiently transfer the heat of the amplification layer 24 to the cooling part 30, and thus it is possible to more properly cool the amplification layer 24.

Further, in the solid laser amplification device 10, the amplification layer 24, the cooling part 30, and the thermally conductive part 40 are provided on each of the opposite surfaces of the medium 22 along the direction Y. Therefore, in the solid laser amplification device 10, it is possible to reliably provide the cooling part 30 and the thermally conductive part 40 at a place (in this embodiment, the amplification layer 24 provided on a bottom surface 23 of the medium 22) which easily reaches a high temperature by receiving the laser light L, in the slab-type solid laser in which the laser light L advances in a zigzag manner. Therefore, in the solid laser amplification device 10, it is possible to more efficiently remove the heat of the amplification layer 24 and more properly cool the amplification layer 24.

Further, in the solid laser amplification device 10, a plurality cooling parts 30 and a plurality of thermally conductive parts 40 are provided at predetermined intervals along a traveling direction of the laser light L (the direction X). According to the solid laser amplification device 10, the cooling part 30 and the thermally conductive part 40 can be provided at only a place (in this embodiment, the amplification layer 24 provided on the bottom surface 23 of the medium 22) which easily reaches a high temperature by receiving the laser light L. For this reason, in the solid laser amplification device 10, it is possible to further cool a high temperature part than a low temperature part and it is possible to suppress the bias of a temperature distribution in the laser medium part 20. In this way, in the solid laser amplification device 10, it is possible to suppress a decrease in the performance of the laser light L.

Further, in the solid laser amplification device 10, the thermally conductive part 40 is a graphite sheet, the surface 42 on one side thereof is in contact with the amplification layer 24, and the surface 44 on the other side is in contact with the cooling part 30. The thermally conductive part 40 is a graphite sheet having high thermal conductivity, and therefore, it is possible to more efficiently transfer the heat of the amplification layer 24 to the cooling part 30 and it is possible to more properly cool the amplification layer 24. However, the thermally conductive part 40 is not limited to being a graphite sheet, and any material can be used as long as it can efficiently transfer the heat of the amplification layer 24 to the cooling part 30.

Further, in the thermally conductive part 40, the thermal conductivity thereof along the directions (the directions C and D) parallel to the surface 42 on one side is higher than the thermal conductivity the along direction (the direction E) crossing the surface 42 on one side. Therefore, in the solid laser amplification device 10, it is possible to diffuse the heat of the amplification layer 24 in a surface direction of the thermally conductive part 40 and cool the heat on the entire surface 31a of the cooling part 30. Therefore, the thermally conductive part 40 can more properly cool the amplification layer 24. Further, in the solid laser amplification device 10, the heat of the amplification layer 24 is diffused in the surface direction of the thermally conductive part 40, and therefore, the heat of the amplification layer 24 is made uniform along the surface, so that it is also possible to suppress the bias of a temperature distribution in the laser medium part 20.

However, in the thermally conductive part 40, the thermal conductivity thereof along the directions (the directions C and D) parallel to the surface 42 on one side may be lower than the thermal conductivity along the direction (the direction E) crossing the surface 42 on one side. In this case, the graphite layers extending along the direction E are laminated along the direction C or the direction D. In this case, heat can be rapidly transferred in the direction E, that is, in the direction toward the cooling part 30 from the amplification layer 24, and therefore, it becomes possible to more rapidly cool the amplification layer 24.

In this embodiment, the microchannel part 31 is a metal member. However, at least the surface 31a that is a surface which is in contact with the thermally conductive part 40 may be configured of a graphite sheet, similar to the thermally conductive part 40. In this case, the thermal conductivity of the microchannel part 31 itself becomes higher, and therefore, it is possible to more properly cool the amplification layer 24. In this case, it is preferable that a place between the surface 31a and the plurality of flow paths 36 is configured by laminating graphite sheets. In the graphite sheet, similar to the thermally conductive part 40, the graphite layers extending in the directions A and B parallel to the surface 31a may be laminated along the direction crossing the directions A and B, or the graphite layers extending along the direction crossing the directions A and B may be laminated along the direction A or the direction B.

The present embodiment of the present invention has been described above. However, an embodiment is not limited by the content of this embodiment. Further, in the constituent elements described above, constituent elements which can be easily anticipated by those skilled in the art, constituent elements which are substantially equal to the constituent elements described above, and so-called equivalents are included. Further, it is possible to appropriately combine the constituent elements described above. Further, various omissions, substitutions, or changes of constituent elements can be made within a scope which does not depart from the gist of the present embodiment described above.

REFERENCE SIGNS LIST

1: solid laser device
10: solid laser amplification device
12: accommodation chamber
12a: entrance window
12b: exit window
20: laser medium part
22: medium
24, 24A, 24B, 24C: amplification layer
25: surface
26: entrance part
27: exit part
30, 30A, 30B, 30C: cooling part
31: microchannel part
31a: surface
31b, 31c: side surface
32: inlet header part
32a: introduction opening portion
34: outlet header part
34a: lead-out opening portion
36: flow path
40, 40A, 40B, 40C: thermally conductive part
42, 44: surface
50: cooling solvent cooling part
52: introduction pipe
54: lead-out pipe
100: light emitting part
102: irradiation part
A, B, C, D, E, X, Y, Z: direction
L: laser light
W: cooling solvent

The invention claimed is:

1. A solid laser amplification device comprising:
a laser medium part which has a solid medium, into which a laser light enters from an entrance part and from which the laser light is emitted from an exit part to the outside, and an amplification layer which is provided on a surface of the medium, receives the laser light in the medium, and amplifies and reflects the laser light toward the exit part;
a microchannel type cooling part of a plate-shaped member which cools the amplification layer; and
a thermally conductive part which is provided in contact with the amplification layer and the cooling part between the amplification layer and the cooling part and transfers heat of the amplification layer to the cooling part,
wherein a surface of the cooling part is in contact with the thermally conductive part, and
the cooling part has a plurality of flow paths opened therein which extends along a direction parallel to the surfaces of the cooling part and the medium, and in which a cooling solvent flows, wherein,
a thermal conductivity of the thermally conductive part is higher than a thermal conductivity of the laser medium and a thermal conductivity of the cooling part, and
the thermally conductive part is a graphite sheet, a surface on one side of the thermally conductive part is in contact with the amplification layer, and a surface on the other side is in contact with the cooling part, and wherein
in the thermally conductive part, thermal conductivity thereof along a direction parallel to the surface on the one side is higher than thermal conductivity thereof along a direction perpendicular to the surface on the one side.

2. The solid laser amplification device according to claim 1, wherein the amplification layer, the thermally conductive part, and the cooling part are provided on each of the opposite surfaces of the medium.

3. The solid laser amplification device according to claim 2, wherein a plurality of the cooling parts and a plurality of the thermally conductive parts are provided at predetermined intervals along a traveling direction of the laser light.

4. The solid laser amplification device according to claim 1 further comprising:
an inlet header part which is connected to one end side of the cooling part for making an internal space thereof communicate with each of the plurality of flow paths for introducing the cooling solvent into the internal space, and
an outlet header part which is connected to another end side of the cooling part for making an interval space thereof communicate with each of the plurality of flow paths for introducing the cooling solvent from the internal space to outside the internal space.

* * * * *